United States Patent [19]

Swider et al.

[11] Patent Number: 4,568,710
[45] Date of Patent: * Feb. 4, 1986

[54] SELF-CROSSLINKABLE ELECTROCOAT RESINS PREPARED BY ROOM TEMPERATURE REACTIONS OF EPOXY RESINS AND FATTY AMIDOPOLYAMINES

[75] Inventors: Robert A. Swider, Livonia; Martha E. Horsch, Dearborn Heights, both of Mich.

[73] Assignee: Ford Motor Company, Dearborn, Mich.

[*] Notice: The portion of the term of this patent subsequent to May 7, 2002 has been disclaimed.

[21] Appl. No.: 555,676

[22] Filed: Oct. 31, 1983

[51] Int. Cl.$^4$ .................... C08L 63/00; C09D 5/44
[52] U.S. Cl. .................... 523/420; 523/415; 523/416; 523/417; 525/523; 525/533; 528/123; 528/45; 524/901; 204/181.7
[58] Field of Search ............. 525/523, 533; 528/123, 528/45; 523/420, 415, 416; 524/901; 204/181 C

[56] References Cited

U.S. PATENT DOCUMENTS

| | | | |
|---|---|---|---|
| 2,705,223 | 3/1955 | Renfrew et al. | 525/533 |
| 3,257,342 | 6/1966 | Kwony | 525/533 |
| 3,417,140 | 12/1968 | McWhorter et al. | 528/120 |
| 3,922,253 | 11/1975 | Jerabek et al. | 528/45 |
| 3,947,338 | 3/1976 | Jerabek et al. | 204/181.7 |
| 3,947,339 | 3/1976 | Jerabek et al. | 204/181.7 |
| 4,036,795 | 7/1977 | Tominaga | 523/415 |
| 4,115,296 | 9/1978 | Andrews | 525/523 |
| 4,134,866 | 1/1979 | Tominaga | 523/415 |
| 4,137,140 | 1/1979 | Belanger | 204/181.7 |
| 4,139,510 | 2/1979 | Anderson | 524/901 |
| 4,179,418 | 12/1979 | Waddill | 523/401 |
| 4,182,831 | 1/1980 | Hicks | 528/103 |
| 4,190,564 | 2/1980 | Tominaga et al. | 523/415 |
| 4,274,989 | 6/1981 | Tominaga et al. | 528/45 |
| 4,515,911 | 5/1985 | Swider | 523/415 |

FOREIGN PATENT DOCUMENTS 1235975 6/1971 United Kingdom .

OTHER PUBLICATIONS

Room Temperature Curing Electrodeposited Coatings, North A. G., J 0;1 Colour Chem. Ass. 1970, 53, 353-362.

Primary Examiner—John Kight
Assistant Examiner—Garnette D. Draper
Attorney, Agent, or Firm—Lorraine S. Melotik; Roger L. May

[57] ABSTRACT

The invention relates to cathodically electrodepositable coating compositions comprising an aqueous dispersion of self-crosslinkable resin. The self-crosslinkable resin is amine and epoxide functional and prepared by reacting epoxide resin with fatty amidopolyamine at about room temperature so as to form a partially crosslinked resin, wherein at least about 50 percent of the amine groups have been neutralized with a water soluble acid. The partially crosslinked resin can be deposited from the bath onto a metal substrate and cured at elevated temperatures to form a coating offering excellent corrosion protection and having excellent adhesion to the substrate.

20 Claims, No Drawings

SELF-CROSSLINKABLE ELECTROCOAT RESINS PREPARED BY ROOM TEMPERATURE REACTIONS OF EPOXY RESINS AND FATTY AMIDOPOLYAMINES

Reference is made to concurrently filed and commonly assigned related U.S. application Ser. No. 563,422 now U.S. Pat. 4,575,911 entitled "Self-Crosslinkable Electrocoat Resins Prepared by Room Temperature Reactions of Epoxy Resins and Polyamines Containing Primary and Tertiary Amine Groups", to Swider et al.

TECHNICAL FIELD

This invention relates to water dispersible cathodically electrodepositable, self-crosslinkable resins. More particularly, these resins are amine-functional and epoxide-functional and are the partially crosslinked, room temperature reaction product of epoxy resins and fatty amidopolyamines.

BACKGROUND ART

The coating of electroconductive substrates by electrodeposition is an important industrial process. In this process, a conductive article is immersed as one electrode in a coating composition made from an aqueous dispersion of film-forming polymer. An electric current is passed between the article and a counter electrode in electrical contact with the aqueous dispersion until a desired amount of coating is produced on the article. The article to be coated can be made the anode or the cathode depending upon the ionic nature of the coating system.

Cationic coating compositions generally are derived from resinous compositions containing a basic nitrogen atom which can be neutralized with an acid and then be dissolved or dispersed in water. Sufficient basic nitrogen atoms should be present so that the dispersibility or solubility can be obtained with a minimum amount of acid.

The most commonly employed type of cathodically electrodepositable resins are made by reacting polyepoxide resins with amines at elevated temperatures, as exemplified by U.S. Pat. No. 4,137,140 to Belanger and U.S. Pat. No. 4,182,831 to Hicks. Belanger teaches forming an electrocoat resin by reacting polyepoxides with polyamines and then modifying the product by reaction with a monoepoxide or a monocarboxylic acid. In the Hicks patent, the electrocoat resin is taught to be the reaction product of polyepoxides, a mixture of primary amines, and a monoepoxide. As illustrated by these patents, when forming this type of resin the amount of amine reacted with the epoxy group containing material is generally at least that amount necessary to react all the epoxide groups and form a hydroxyl amine resin. However, since these resins contain essentially no unreacted epoxide groups available for later crosslinking the amine during curing, they require a crosslinking agent which is capable of reacting with the hydroxyl or amine functionality of the resin during curing to form a thermoset film. The crosslinking agent may be present in the coating bath so as to codeposit with the resin or it may be incorporated into the resin molecule. Hicks and Belanger teach codepositing the resin with a crosslinker such as an aminoplast or phenoplast resin. On the other hand, Jerabek et al in U.S. Pat. Nos. 3,922,253 and 3,947,338 disclose reacting a partially blocked isocyanate crosslinking agent with the epoxy resins and amines, so as to incorporate the crosslinker into the resin molecule. That electrocoat resin product is thus able to self-crosslink during baking to form a thermoset film.

Binders for cathodic electrodeposition have been prepared by simply combining epoxy resins with amine compounds. However, aqueous dispersions of these binders are very unstable, because of the presence of free (unreacted) epoxide groups. Thus, these two component compositions are less than desirable for use as electrodepositable coatings. Such compositions are taught by Munn et al in British Pat. No. 1,235,975 and in Room Temperature Curing Electrodeposited Coatings, A. G. North, J. Oil Colour Chem. Assoc., 53 (1970) 353. While it is generally recognized in these references that the stability of the compositions in the coating bath is usually limited to a few hours, one advantage of this type of coating, when compared to prior art electrodepositable coatings, is taught to be its ability to be cured at low temperatures, e.g., room temperature.

DISCLOSURE OF THE INVENTION

The coating compositions of this invention are cathodically electrodepositable and are characterized in that they comprise an aqueous dispersion of self-crosslinkable resin which contains amine and epoxide groups, the resin being prepared by reacting (A) epoxy resin having, on the average, more than one and up to about two epoxide groups per molecule and an epoxide equivalent weight between about 400 and about 4000, preferably between about 450 and about 2000, with (B) fatty amidopolyamine containing at least two reactive amine groups and at least three active amine hydrogens per molecule and no other groups capable of reacting with the epoxide groups. The fatty polyamine also contains amide functionality. The fatty portion of the polyamine comprises between about 12 and about 36 carbon atoms. The epoxy resin and the polyamine are combined and reacted in the presence of an organic solvent in which they are mutually soluble. The reaction solution mixture comprises (i) a total of between about 70 and about 25 weight percent of reactants (A) and (B) and (ii) between about 30 and about 75 weight percent solvent. The epoxy resin and the fatty amidopolyamine are reacted in solution in amounts so as to provide between about 0.25 and about 1.0, preferably between about 0.5 and about 1.0 reactive amine groups of (B) for each epoxide group of (A). The reaction is carried out at room temperature, i.e., at between about 18° and about 33° C., preferably between about 21° and about 27° C., for a period of time so as to react between about 20 and about 50 percent of the epoxide groups of the epoxy resin with active amine hydrogens to form a partially crosslinked, self-crosslinkable resin. This partially crosslinked, self-crosslinkable resin has a weight average ($\overline{M}_w$) molecular weight of between about 1300 and about 12,000, preferably between about 2400 and about 6500.

In order to subtantially limit further reaction between the epoxide and amine groups, the amine groups of the reaction mixture are neutralized with a water soluble acid in an amount sufficient to neutralize at least 50 percent, preferably greater than 90 percent, most preferably, essentially all of the amine groups present in the mixture. The resin is then dispersed in water to form a cathodically electrodepositable coating composition. The coating composition may include such commonly employed materials as plasticizing agents and catalysts. While crosslinking agents such as aminoplast resins or blocked isocyanates may also be included in the composition in a limited amount, it is preferable that such crosslinking agents not be included in the composition. The coating composition may be cathodically electrodeposited on a metal substrate and thereafter subjected to baking, during which it crosslinks to form a thermoset film.

Advantageously, these self-crosslinkable resins when used, for example, as a primer coating on steel possess exceptional adhesion to the steel and thus offer excellent corrosion protection for the steel.

Yet another advantage of the partially crosslinked resins of this invention is that they display excellent stability in the coating bath. It has been found that coating baths made according to the invention of this application, wherein all the amine groups have been neutralized, are stable in excess of six weeks and that coatings made from these baths have excellent film quality and corrosion resistance.

Significantly, the resins of this invention offer the advantage that they are made by simpler methods of manufacture and comprise simpler compositions than those of fully epoxide reacted resins conventionally employed in primer coatings. As described above, these conventionally employed resins additionally need a crosslinking agent for curing. Thus, the resins of this invention offer cost advantages in their manufacture, particularly since they are made from materials reacted at room temperature, wherein the reaction mixture need not be agitated during the reaction process.

BEST MODE FOR CARRYING OUT THE INVENTION

The invention of this application is directed to a cathodically electrodepositable, self-crosslinkable resin dispersed in water as has been described briefly above.

In order to form the electrodepositable, self-crosslinking resin of this invention, an epoxy resin and a fatty amidopolyamine are partially reacted at room temperature in an organic solvent for both reactants. The reaction mixture is allowed to stand or may be stirred, although stirring is not necessary, for a period of time at room temperature, so as to allow the reaction to take place. When the desired number of epoxide groups have reacted, about 20-50 percent, (generally corresponding to a reaction time period of between about 12-36 hours), the reaction mixture is neutralized with a water soluble acid so as to limit the ongoing reaction between the epoxide and the reactive amine groups of the reactants. The amount of acid employed must be sufficient to neutralize at least 50 percent, preferably greater than 90 percent, most preferably, essentially all of the amine groups in the mixture, which amine groups are either present on the self-crosslinkable resin or on unreacted fatty aminopolyamine. However, it appears that essentially all of the fatty amidopolyamine is incorporated to some extent during the reaction period into the self-crosslinkable resin by reaction of fatty polyamine with some of the epoxide groups of the epoxy resin. The neutralized self-crosslinkable resin mixture is then dispersed in water to form a cathodically electrodepositable coating composition comprising the self-crosslinkable resins.

The epoxy resins useful in forming the self-crosslinkable resin of this invention have, on average, more than one and up to about two epoxide groups per molecule. These epoxy resins have an epoxide equivalent weight of between about 400 and about 4000, preferably between about 450 and about 2000. Such polyepoxide resins may be derived from a dihydric phenol or a dihydric alcohol and an epihalohydrin. Examples of epihalohydrins are epichlorohydrin, epibromohydrin and epiiodohydrin with eipchlorohydrin being preferred. Dihydric phenols and dihydric alcohols are exemplified by resorcinol, hydroquinone, Bisphenol A, p,p'-dihydroxy benzol phenone, p,p'-dihydroxy phenol, p,p'-dihydroxy diphenol ethane, bis-(2-hydroxy naphtha) methane, 1,5-dihydroxy naphthaline, ethylene glycol, proylene glycol, 1,4-butane diol, hydrogenated Bisphenol A, 1,4-cyclohexane diol, 1,3-cyclopentane diol, cyclohexane dimethanol, and the like. These polyepoxide resins are well known in the art and are made in the desired molecular weights by reacting the epihalohydrin and the diols in various ratios, or by reacting a dihydric phenol with a lower molecular weight polyepoxide resin. Preferred polyepoxide resins are the glycidyl polyethers of Bisphenol A having the epoxide equivalent weight stated above. Examples of epoxy resins which are commercially available and suitable for use in this invention include Epon 1001F, 1002F, 1004F, 1007F, 1009F, available from a trademark of Shell Chemical Company (Houston, Tex.), Araldite 6084, 6097, 6099 7065, 7072 and 7097 available from Ciba-Geigy (Ardsley, N.Y.), and DER 661, 664, 667 and 669 available from Dow Chemical Company (Midland, Mich.). Mixtures of these epoxy resins may also be employed as the epoxy resin reactant useful in forming the self-crosslinking resin of this invention.

The fatty amidopolyamines used in this invention contain at least two reactive amine groups which together contain at least three active amine hydrogens per molecule. During the formation of the self-crosslinkable resin, reaction will take place between active amine hydrogens of the fatty amidopolyamine and epoxide groups of the epoxy resin. The amine groups of the fatty amidopolyamine may be selected from primary, secondary or tertiary amine groups, as long as the polyamine contains at least three active amine hydrogens per molecule. For example, the polyamine may contain three secondary amine groups. Preferably, however, at least one amine of the fatty amidopolyamine is a primary amine group and, more preferably, only one of the amine groups is present as a primary amine group. The preferred embodiment fatty amidopolyamine is an alkylene fatty amidopolyamine containing between about 1-4 alkylene nitrogen units. The fatty portion of the fatty polyamine comprises between about 12-36 carbon atoms, preferably between about 12-18 carbon atoms, most preferably between about 16-18 carbon atoms. The fatty portion may be straight chain or branched, and may be substituted with non-interfering functionality.

The polyamine may not contain any other type of functionality which could react with the epoxide groups of the epoxy resin. That is, no other functionality should be present on the polyamine which would interfere with the reaction of the amine and epoxide groups of the reactants of the mixture. However, groups not reactive with epoxide may be included in the fatty amidopolyamine. One such non-epoxide reactive group which is present is amide.

Preferably, the fatty amidopolyamine has a weight average ($\overline{M}_w$) molecular weight of between about 300 and about 1000, more preferably between about 350 and about 550. Suitable commercially available fatty amidopolyamines which may be employed in this invention include Genamid 747, Genamid 250 and Genamid 2000, with Genamid 250 being preferred, (available from and a trademark of Henkel Corporation, Minneapolis, Minn.). Mixtures of fatty amidopolyamines as described above could also be employed in this invention as the fatty amidopolyamine reactant.

The epoxy resin and the fatty amidopolyamine are combined in the reaction mixture in amounts so as to provide between about 0.25 and about 1.0, preferably between about 0.5 and about 1.0 reactive amine groups present on the fatty amidopolyamine for each epoxide group present on the epoxy resin. The reactants are dissolved in an organic solvent in which both reactants are soluble. The reaction mixture comprises (i) between about 30 and about 75 weight percent solvent and (ii) a total of between about 70 and about 25 weight percent of reactants (A) and (B), preferably between about 40 and about 60 weight percent solvent and between about 60 and about 40 weight percent total of reactants (A) and (B). The reaction temperature of the mixture is between about 18° and about 33° C., preferably between about 21° and about 27° C.

Suitable solvents include alcohols, ethers, ketones, as well as aromatic hydrocarbons and phthalates. Exemplary of the alcohols are butanol, isopropanol, hexanol, etc. Ethers which may be used include, but are not limited to, propylene glycol methyl ether, dipropylene glycol methyl ether and ethylene glycol ether acetate, with the cellosolve type ethers being preferred. Ketones which may be so employed include methyl butyl ketone, methylisobutyl ketone, methyl propyl ketone, methyl ethyl ketone, etc. Useful aromatic solvents include xylene, toluene, ethyl benzene, etc. Phthalates useful as solvents in this invention include dimethyl, diproyl, dibutyl, and dioctyl phthalates. Preferably, blends of such solvents are employed as the solvent in this invention. While solvents which may be used have been disclosed above, this disclosure is not meant to be limiting. Other suitable organic solvents which may be used to dissolve the reactant and form the reaction mixture will be apparent to those skilled in the art.

As has been stated above, the reactants are reacted for a period of time so as to react between about 20 and about 50 percent of the epoxide groups present in the reaction mixture. The completeness of the epoxide reaction can be determined by means such as Infrared Absorption. At the desired percent conversion of epoxide groups, the amine groups present in the reaction mixture are neutralized with water soluble acid. The amount of acid used must be more than that needed to simply disperse the resin. Rather, sufficient acid must be employed so as to neutralize at least 50 percent, preferably greater than 90 percent, most preferably, essentially all of the amine groups in the mixture. This neutralizing substantially limits or, in the most preferred embodiment wherein essentially all the amine groups are neutralized, stops any further reaction of amine and epoxide groups. Acids which may be so employed include water soluble monocarboxylic acids such as formic, propionic, lactic, acetic and butanoic, just to name a few, with lactic acid being preferred.

Optionally, other commonly employed materials may be included in the coating composition comprising the dispersed self-crosslinkable resin disclosed in this application. These optional constituents are generally mixed into the reaction mixture prior to the addition of the water soluble acid, although they may be added after the addition of the acid. Such optional constituents include, but are not limited to, plasticizers, pigments, catalysts and crosslinking agents. Such plasticizers include dioctylphthalate, polyhydroxy polyethers (e.g., Eponol 52B40 or Eponol 53B40, Shell Chemical, Houston, Texas), hydroxy acrylate (e.g., G-Cure 868, Rohm & Haas Company, Philadelphia, Pa.), etc. Pigments, when included, generally comprise up to about 4 weight percent of the coating composition bath. Crosslinking agents may include blocked polyisocyanates, aminoplast resins or phenoplast resins. Thus, in addition to the resins ability to self-thermoset, the amine and hydroxyl group of the resin (the hydroxyl being produced by the amine-epoxide reactions) can crosslink with blocked isocyanate at elevated temperatures to form polyurethane and polyurea. The amide and hydroxyl groups can also crosslink with aminoplast or phenoplast crosslinkers at elevated temperatures. However, while crosslinking agents may be included in the coating composition, it is preferred not to employ any additional crosslinking agents. It has been found that the cationic self-crosslinking resin coatings of this invention, when used without additional crosslinking agents, possess greater throwing power than such cationic coating compositions which contain additional crosslinking agents. If however, additional crosslinking materials are employed, they would preferably not comprise more than 6.5 weight percent of the coating bath. Selection of such commonly employed crosslinking agents of the types mentioned above, will be well within the skill of one in the art.

The coatings comprising the dispersed resin of this invention may be coated onto metal substrates by cathodic electrodeposition methods well known to one skilled in the art. Generally, voltages of between about 300 and about 400 volts are employed for between about 2 and about 3 minutes so as to provide coatings between about 12 and about 40 microns. Selection of optimal coating conditions would be well within the skill of one in the art, and those described above are not meant to be limiting to the invention of this application.

The invention will be further understood by referring to the following detailed examples. It should be understood that the specific examples are presented by way of illustration and not by way of limitation.

EXAMPLE 1

A self-crosslinking room temperature reacted cathodic electrocoat primer was prepared as follows:
(A) 1750 grams—Polyglycidyl ether of Bisphenol A (Epon 1004F[1]), possessing an epoxide equivalence of 950, were dissolved into a mixture of
(B) 290 grams—Hexylcellosolve,
(C) 1060 grams—Dipropylene glycol methyl ether, and
(D) 370 grams—Dioctylphthalate.
(E) 250 grams—Genamid 250[2], a room temperature reactive amide possessing an amine equivalent weight of 128, were worked into the resin solution of (A)-(D) at room temperature (about 22°-25° C.) and permitted to stand for 20 hours overnight. Immediately afterwards
(F) 200 grams—88% lactic acid were worked into the reacted resin from (E) to neutralize all the amine groups in the reaction mixture. Using a high speed stirrer or blender
(G) 53 grams—Carbon black pigment were blended into the acid neutralized resin mixture from (F).

(H) 6027 grams—Deionized water were added to the paint from (G) with mixing to give (I) 10,000 grams—20% by weight cathodic electrocoat paint emulsion, which was stirred vigorously for 2 to 3 hours before being diluted with (J) 10,000 grams—Deionized water to give (K) 20,000 grams—10.3 percent by weight black electrocoat primer bath.

[1] Trademark of Shell Chemical Company
[2] Trademark of Henkel Corp., Minneapolis, Minn.

The bath from (K) was placed into a stainless steel container and stirred for about 24 hours. A zinc phosphated steel panel cathode was coated at 300 volts for 2 minutes at 23° C. After the panel was baked at 182° C. air temperature for 25 minutes, the panel had a 22.8 micron thick coating. Additional panels were coated and baked as described. The panels after salt spray testing testing according to ASTM Test B-117 for 500 hours showed no sign of failure. The bath from (K) showed excellent stability in excess of six weeks, producing electrocoats with excellent film quality and corrosion resistance.

EXAMPLE 2

A self-crosslinking, room temperature reacted cathodic electrocoat primer was prepared as follows:

(A) 1810 grams—Epon 1004F[1] were dissolved into a mixture of (B) 370 grams—Dioctyphthalate, (C) 320 grams—Hexylcellosolve, and (D) 1150 grams—Dipropylene glycol methyl ether.

(E) 190 grams—Genamid 2000[2] having an amine equivalent weight of 93.5 were blended with the resin solution of (A)–(D) at about 23° C. and the mixture was permitted to stand at room temperature (about 23°-25° C.) for 16 hours. Immediately afterwards the reacted resin from (E) was blended with (F) 53.3 grams—Carbon black pigment using a high speed blender as in Example 1.

(G) 200 grams—88% lactic acid were used to neutralized all amine groups in the pigmented resin. Deionized water was worked into the neutralized paint to give (H) 10,000 grams—Emulsion, which was vigorously blended on a high speed stirrer for 2 to 3 hours. Afterwards (I) 10,000 grams—Deionized water were used to dilute the emulsion from (H) to a 20,000 gram 10% solids by weight electrocoat primer bath.

[1] Trademark of Shell Chemical Company
[2] Trademark of Henkel Corp., Minneapolis, Minn.

The bath from (I) was placed into a stainless steel container and stirred for at least 24 hours. A zinc phosphated steel panel cathode was coated at 300 volts for two minutes, at 23° C. After the panel was baked at 180° C. for 25 minutes, the panel was found to be coated by a 22.0 micron thick coating. Additional similarly coated panels after being baked as described above were salt spray tested as in Example 1 for 500 hours, and showed no signs of failure. As in Example 1, the bath (I) showed excellent stability and coatings from this bath provided excellent corrosion resistance.

EXAMPLE 3

A self-crosslinking room temperature reacted cathodic electrocoat primer paint was prepared as follows:

(A) 1590 grams—Epon 1001F[1] were dissolved in a mixture of (B) 1160 grams—Dipropylene glycol methyl ether, (C) 320 grams—Hexylcellosolve, and (D) 370 grams—Dioctylphthalate.

(E) 410 grams—Genamid 250[2] were blended into the resin solution from (A)–(D) at about 23° C. and permitted to stand for 16 hours at room temperature (about 23°-25° C.). Immediately afterwards the reacted resin from (E) was blended with (F) 400 grams—Titanium dioxide and (G) 45 grams—Carbon black. All the amine group were neutralized with (H) 320 grams—88% lactic acid, which were worked into the pigment resin (G). The paint from (H) was emulsified with deionized water to a weight of 10,000 grams, followed by vigorous stirring of the emulsion for 2 to 3 hours. Afterwards (I) 10,000 grams—Deionized water were used to dilute the emulsion to a 20,000 grams electrocoat bath.

[1] Trademark of Shell Chemical Company
[2] Trademark of Henkel Corp., Minneapolis, Minn.

The electrocoat bath was placed into a stainless steel container and agitated with a stirrer. Zinc phosphated panels were coated and baked as in Example 1. The panels had coatings 25 micron thick which salt spray tested without failure for 500 hours. Stability and corrosion resistance of the bath and electrocoats were excellent.

EXAMPLE 4

A self-crosslinking electrocoat paint composed of a blend of epoxy resins was prepared as follows:

(A) 1630 grams—Epon 1004F[1] and (B) 180 grams—Epon 1001F[1] were dissolved in a mixture of (C) 320 grams—Hexylcellosolve, (D) 1160 grams—Dipropylene glycol methyl ether, and (E) 370 grams—Dioctylphthalate.

(F) 190 grams—Genamid 2000[2] possessing an amine equivalent weight of 93.5 were blended into the resin solution of (A)–(E) at about 22° C., and the mixture from (F) was permitted to stand in the covered container for 16 hours (overnight) at room temperature (about 22°-25° C.

(G) 53.3 grams—Carbon black were worked into the reacted resin from (F) along with (H) 213 grams—88% lactic acid. Deionized water was mixed into the completely neutralized paint from (H) slowly for emulsification to produce a (I) 10,000 grams—Electrocoat primer paint emulsion which was vigorously stirred for 2 to 3 hours.

(J) 10,000 grams—Deionized water was finally mixed into the paint emulsion from (I), to yield a (K) 20,000 grams—Electrocoat primer paint bath.

[1] Trademark of Shell Chemical Company
[2] Trademark of Henkel Corp., Minneapolis, Minn.

As in Example 1, the bath was placed into a stainless steel container and zinc phosphated steel panel cathodes were coated at 300 volts for 2 minutes at 23° C. After baking the coated panels in a 180° C. convection oven for 25 minutes, the panels had coatings 17.8 microns thick. All panels passed 500 hours salt spray testing.

EXAMPLE 5

A amido epoxy blocked isocyanate electrocoat composition was prepared as follows:

(A) 2180 grams—Epon 1007F[1] and (B) 550 grams—Epon 1001F[1] were dissolved in a mixture of (C) 2070 grams—Dowanol DPM[2] (dipropylene glycol methyl ether),
(D) 570 grams—Hexylcellosolve, and
(E) 650 grams—Dioctylphthalate.
(F) 290 grams—Genamid 250[3] were reacted at room temperature with the resin solution from (A)–(E) for 16 hours, after which
(G) 242.5 grams—Desmodur 2412[4] (blocked isocyanate) along with
(H) 231.5 grams—88% lactic acid and
(I) 150.0 grams—Carbon black were worked into (G) to give a neutralized pigmented resin. Deionized water was added to disperse the neutralized paint from (I) to give a 20,000 gram bath.

[1]Trademark of Shell Chemical Company
[2]Trademark of Dow Chemical Company, Midland, Mich.
[3]Trademark of Henkel Corp., Minneapolis, Minn.
[4]Trademark of Mobay Chemical Company, Akron, Ohio.

The bath was placed into a stainless steel container and stirred for 24 hours. A throwing power test according to Ford Test Method was performed using zinc phosphated panels as the cathode. The panels showed a throwing power of 5 inches using a voltage of 400 volts for 2½ minutes at 23° C. The bath showed excellent stability and coating produced from the bath, after baking as in Example 1, were smooth, glossy and displayed excellent corrosion resistance.

EXAMPLE 6

A amido epoxy aminoplast crosslinking cathodic electrocoat primer paint was prepared as in Example 5 except the blocked isocyanate in (G) of Example 5 was replaced by 176 grams Cymel-1141, a melamine formaldehyde crosslinking agent, available from American Cyanamide, Wayne, N.J.

The bath was placed into a stainless steel container as in Example 5 and stirred at least 24 hours. The throw power test conducted on the bath as in Example 5 showed 5 inches throw on zinc phosphated steel.

EXAMPLE 7

A self-crosslinking amido epoxy cathodic electrocoat primer paint was prepared as in Example 5 except that no crosslinking agent (G) was employed in the paint.

The bath was placed into a stainless steel container and stirred for at least 24 hours. The throw power test conducted at 400 volts for 2½ minutes at 23° C. showed 12.5 inches throw power.

EXAMPLE 8

A self-crosslinking room temperature reacted cathodic electrocoat primer was prepared as follows:
(A) 1750 grams—Polyglycidyl ether of Bisphenol A (Epon 1004F[1]), possessing an epoxide equivalence of 950, were dissolved into a mixture of
(B) 1350 grams—Dipropylene glycol methyl ether, and
(C) 370 grams—Dioctylphthalate.
(D) 250 grams—Genamid 250[2], a room temperature reactive amide possessing an amine equivalent weight of 128, were worked into the resin solution of (A)–(C) at room temperature and permitted to stand overnight. Immediately afterwards
(E) 200 grams—88% lactic acid were worked into the reacted resin mixture from (D), using a high speed stirrer or blender, so as to neutralize all the amine groups in the resin mixture.
(F) 53 grams—Carbon black pigment were blended into the neutralized paint from (E).
(G) 6027 grams—Deionized water were added to the paint from (F) with mixing to give
(H) 10,000 grams—20 percent by weight cathodic electrocoat paint emulsion, which was stirred vigorously for 2 to 3 hours before diluting with
(I) 10,000 grams—Deionized water to give
(J) 20,000 grams—10.3 percent by weight black electrocoat primer bath.

[1]Trademark of Shell Chemical Company
[2]Trademark of Henkel Corp., Minneapolis, Minn.

The bath from (J) was placed into a stainless steel container and stirred for about 24 hours. A zinc phosphated steel panel cathode was coated at 300 volts for 2 minutes at 23° C. After the panel is baked at 182° C. air temperature for 25 minutes, the panel had a 22.8 micron thick coating. Additional panels were coated and salt spray tested according to ASTM Test B-117. The panels after testing for 500 hours showed no sign of failure.

EXAMPLE 9

A self-crosslinking, room temperature reacted cathodic electrocoat paint was prepared as in Example 1 except that 117 grams of acetic acid was used in place of the lactic acid in (F) of Example 1 to neutralize all the amine groups.

The bath from (K) was placed into a stainless steel container and stirred 24 hours. Zinc phosphated steel panels used as the cathode were coated at 350 volts for 2½ minutes at 23° C. The panels were baked for 25 minutes at 182° C. to yield 17 micron thick cathodic electrocoats. The coated panels showed no sign of failure after being 500 hours corrosion tested according to ASTM Test B-117.

EXAMPLE 10

A self-crosslinking cathodic electrocoat primer was prepared according to Example 5, except that no crosslinking agent (G) was employed in the primer composition and the amount of 88% lactic acid used was 116 grams.

After the 16 hour reaction period as in (F) of Example 5, the amine groups in the reaction mixture were neutralized with 116 grams of 88% lactic acid (that amount of acid required to neutralized only about one half of all amine groups in the resin (F) of Example 5).

The bath was placed into a stainless steel container and stirred for about 72 hours. A zinc phosphated steel panel cathode electrode was coated at 350 volts for 2 minutes. After the coated panel was baked at about 180° C. for 25 minutes, the coating was 17 micron thick, glossy, smooth and showed no signs of corrosion failure after 500 hours of salt corrosion testing, ASTM B-117. After about 2½ weeks another zinc phosphated steel cathode panel was coated, which after baking produced a non-glossy, rough appearing, non-uniform coating which failed 500 hour corrosion resistance testing.

INDUSTRIAL APPLICABILITY

It should be apparent from the foregoing, that the cathodically electrodepositable coating compositions of this invention find application as, for example, primer coatings for metals to prevent corrosion.

In view of the disclosure, many modifications of this invention will be apparent to those skilled in the art. It is intended that all such modifications which fall within the true scope of this invention be included within the terms of the appended claims.

I claim:

1. A cathodically electrodepositable coating composition, characterized in that it comprises an aqueous dispersion of self-crosslinkable resin bearing amine and epoxide functionalities and being prepared by reacting:
- (A) epoxy resin having (a) on average, more than one and up to about two epoxide groups per molecule, and (b) an epoxide equivalent weight of between about 400 and about 4000; and
- (B) fatty amidopolyamine containing (a) amide functionality, and (b) at least two reactive amine groups together having at least three active amine hydrogens per molecule and no other groups capable of reacting with epoxide groups, and wherein said fatty portion comprises between about 12–36 carbon atoms, (1) in a reaction mixture comprising (i) a total of between about 70 and about 25 weight percent of reactants (A) and (B) and (ii) between about 30 and about 75 weight percent organic solvent for said reactants, (2) in amounts so as to provide between about 0.25 and about 1.0 reactive amine groups of (B) per each epoxide group of (A), (3) at a reaction mixture temperature of between about 18° and about 33° C., and (4) for a period of time sufficient to react between about 20 and about 50 percent of said epoxide groups with said active amine hydrogens to form an amine and epoxide functional, partially crosslinked resin having a weight average ($\overline{M}_w$) molecular weight of between about 1300 and about 12,000, and subsequently neutralizing amine groups present in said reaction mixture with water soluble acid in an amount sufficient to neutralize at least about 50 percent of said amine groups present therein, and thereafter dispersing said resin in water.

2. A cathodically electrodepositable coating composition according to claim 1, wherein said water soluble acid is employed in an amount sufficient to neutralize greater than 90 percent of said amine groups present therein.

3. A cathodically electrodepositable coating composition according to claim 2, wherein said water soluble acid is employed in an amount sufficient to essentially completely neutralize all of said amine groups present therein.

4. A cathodically electrodepositable coating composition according to claim 1, wherein said epoxy resin is selected from the group consisting of polyglycidyl ethers of Bisphenol A and mixtures thereof.

5. A cathodically electrodepositable coating composition according to claim 1, wherein said epoxy resin has an equivalent weight of between about 450 and about 2000.

6. A cathodically electrodepositable coating composition according to claim 1, wherein said fatty portion of said fatty amidopolyamine comprises a $C_{12}$–$C_{18}$ group.

7. A cathodically electrodepositable coating composition according to claim 1, wherein said fatty amidopolyamine has a weight average ($\overline{M}_w$) molecular weight of between about 300 and about 1000.

8. A cathodically electrodepositable coating composition according to claim 1, wherein said fatty amidopolyamine contains at least one primary amine group.

9. A cathodically electrodepositable coating composition according to claim 1, wherein said fatty amidopolyamine contains one primary amine group.

10. A cathodically electrodepositable coating composition according to claim 1, wherein said fatty amidopolyamine is a fatty amidoalkylenepolyamine.

11. A cathodically electrodepositable coating composition according to claim 1, wherein said reaction mixture comprises (i) a total of between about 40 and about 60 weight percent of said reactants (A) and (B) and (ii) between about 60 and about 40 weight percent of said solvent.

12. A cathodically electrodepositable coating composition according to claim 1, wherein said organic solvents are selected from the group consisting of alcohols, ethers, ketones, aromatic hydrocarbons, phthalates and mixtures thereof.

13. A cathodically electrodepositable coating composition according to claim 12, wherein said organic solvent comprises cellosolve compounds.

14. A cathodically electrodepositable coating composition according to claim 1, wherein said reaction mixture temperature is between about 21° and about 27° C.

15. A cathodically electrodepositable coating composition according to claim 1, wherein said epoxy resin and said fatty amidopolyamine are combined in said reaction mixture in amounts so as to provide between about 0.5 and about 1.0 reactive amine groups of (B) per each epoxide group of (A).

16. A cathodically electrodepositable coating composition according to claim 1, wherein said resin product has a weight average ($\overline{M}_w$) molecular weight of between about 2400 and about 6500.

17. A cathodically electrodepositable coating composition according to claim 1, wherein said water soluble acid comprises one or more water soluble monocarboxylic acids.

18. A cathodically electrodepositable coating composition according to claim 1, wherein said coating composition further comprises crosslinking agents selected from the group consisting of blocked isocyanates, amine aldehyde resins and phenoplast resins.

19. A process for the preparation of a cathodically electrodepositable coating composition comprising an aqueous dispersion of self-crosslinkable resin bearing amine and epoxide functionalities, said process being characterized in that it comprises reacting:
- (A) epoxy resin having (a) on the average, more than one and up to about two epoxide groups per molecule, and (b) an epoxide equivalent weight of between about 400 and about 4000; and
- (B) fatty amidopolyamine containing (a) amide functionality, and (b) at least two reactive amine groups together having at least three active amine hydrogens per molecule and no other groups capable of reacting with epoxide groups, and wherein said fatty portion comprises between about 12–36 carbon atoms, (1) in a reaction mixture comprising (i) a total of between about 70 and about 25 weight percent of reactants (A) and (B) and (ii) between about 30 and about 75 weight percent organic solvent for said reactants, (2) in amounts so as to provide between about 0.25 and about 1.0 reactive amine groups of (B) per each epoxide group of (A), (3) at a reaction mixture temperature of between about 18° and about 33° C., and (4) for a period of time sufficient to react between about 20 and about 50 percent of said epoxide groups with said active amine hydrogens to form an amine and epoxide functional, partially crosslinked resin having a weight average ($\overline{M}_w$)

molecular weight of between about 1300 and about 12,000, and subsequently neutralizing the amine groups present in said reaction mixture with water soluble acid in an amount sufficient to neutralize at least about 50 percent of said amine groups present therein, and thereafter dispersing said resin in water.

20. A process for the preparation of a cathodically electrodepositable coating composition according to claim 19, wherein said water soluble acid is employed in an amount sufficient to neutralize greater than 90 percent of said amine groups present therein.

* * * * *